(12) United States Patent
Shukair et al.

(10) Patent No.: US 9,433,030 B2
(45) Date of Patent: Aug. 30, 2016

(54) VOLTE CALL SETUP

(71) Applicant: QUALCOMM Incorporated, San Diego, CA (US)

(72) Inventors: Mutaz Zuhier Afif Shukair, San Diego, CA (US); Mouaffac Ambriss, San Diego, CA (US); Rao Sanyasi Yenamandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/192,207

(22) Filed: Feb. 27, 2014

(65) Prior Publication Data

US 2015/0201454 A1   Jul. 16, 2015

Related U.S. Application Data

(60) Provisional application No. 61/927,275, filed on Jan. 14, 2014.

(51) Int. Cl.
| | |
|---|---|
| *H04W 4/00* | (2009.01) |
| *H04W 76/04* | (2009.01) |
| *H04L 29/06* | (2006.01) |
| *H04W 76/02* | (2009.01) |
| *H04W 76/06* | (2009.01) |

(52) U.S. Cl.
CPC ........ *H04W 76/045* (2013.01); *H04L 65/1016* (2013.01); *H04L 65/1069* (2013.01); *H04W 76/02* (2013.01); *H04W 76/046* (2013.01); *H04W 76/068* (2013.01)

(58) Field of Classification Search
CPC .... H04W 72/04; H04W 88/08; H04W 76/00
See application file for complete search history.

(56) References Cited

U.S. PATENT DOCUMENTS

| | | | |
|---|---|---|---|
| 8,213,295 B2 | 7/2012 | Ginde | |
| 8,380,206 B1* | 2/2013 | Laitinen | H04W 36/32 455/436 |
| 2005/0141541 A1* | 6/2005 | Cuny | H04W 76/02 370/437 |
| 2005/0193226 A1* | 9/2005 | Ahmed | H04L 69/40 714/4.1 |
| 2009/0059899 A1* | 3/2009 | Bendelac | H04L 12/5692 370/352 |
| 2009/0197589 A1* | 8/2009 | Kitazoe | H04W 76/045 455/422.1 |
| 2010/0088419 A1 | 4/2010 | Phelps et al. | |
| 2010/0144363 A1 | 6/2010 | De Rosa et al. | |
| 2010/0238920 A1* | 9/2010 | Salkintzis | H04W 76/026 370/357 |

(Continued)

OTHER PUBLICATIONS

ISA/EPO, International Search Report and Written Opinion of the International Searching Authority, Int'l. App. No. PCT/US2015/010151, Mar. 25, 2015, European Patent Office, Rijswijk, NL 13 pgs.

(Continued)

*Primary Examiner* — Hassan Phillips
*Assistant Examiner* — Siren Wei
(74) *Attorney, Agent, or Firm* — Holland & Hart LLP

(57) ABSTRACT

Methods, systems, and devices are described for call setup (e.g., VoLTE) for a wireless communication device. During a call setup procedure, the device may implement a "keep alive" mechanism to maintain an RRC connection established as part of the call setup procedure. The "keep alive" mechanism may be configured to insert some padding traffic (e.g., dummy packets) to maintain the RRC connection, for example, by restarting the network RRC connection release timer to prevent its expiration and release of the RRC connection during call setup.

30 Claims, 13 Drawing Sheets

(56) References Cited

U.S. PATENT DOCUMENTS

| | | |
|---|---|---|
| 2011/0093542 A1 | 4/2011 | Lau et al. |
| 2011/0143781 A1* | 6/2011 | Gehlen et al. ............. 455/456.3 |
| 2012/0008536 A1* | 1/2012 | Tervahauta ......... H04L 43/0811 370/311 |
| 2013/0077517 A1* | 3/2013 | Cho ........................ H04L 43/50 370/252 |
| 2013/0151714 A1* | 6/2013 | Ralph et al. ................... 709/227 |
| 2013/0194991 A1* | 8/2013 | Vannithamby ...... H04W 76/048 370/311 |
| 2013/0242716 A1 | 9/2013 | Amerga et al. |
| 2013/0272121 A1* | 10/2013 | Stanwood ........... H04L 47/2475 370/230 |
| 2013/0308620 A1* | 11/2013 | Bharadwaj ............ H04W 40/02 370/338 |
| 2013/0329637 A1* | 12/2013 | Kodali et al. ................. 370/328 |
| 2013/0329647 A1 | 12/2013 | Keller et al. |

OTHER PUBLICATIONS

IPEA/EPO, Second Written Opinion of the International Preliminary Examining Authority, Int'l. App. No. PCT/US2015/010151, Jan. 13, 2016, European Patent Office, Rijswijk, NL, 8 pgs.

* cited by examiner

VOLTE CALL SETUP

CROSS REFERENCES

The present application for patent claims priority to U.S. Provisional Patent Application No. 61/927,275 by Shukair et al., entitled "VoLTE Call Setup," filed Jan. 14, 2014, assigned to the assignee hereof.

BACKGROUND

The following relates generally to wireless communication, and more specifically to telephone calls via a wireless communication device, such as VoLTE (voice over Long Term Evolution). Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

Typically an LTE evolved Node B (eNB) implements an RRC (radio resource control) connection release mechanism based on user traffic, where a user equipment (UE) receives an RRC connection release instruction to transition from connected to idle mode. Usually user activity is tracked by the eNB, and when the UE is not active for certain amount of time (e.g., elapse of a connection release inactivity timer), the eNB will release the connection. The RRC connection release timer implemented in the eNB may be optimized with the loading, where the eNB with high loads tends to have shorter RRC connection release timers.

During IMS (IP Multimedia Subsystem) call setup (e.g., for a VoLTE call), the end-to-end call setup may take typically 4-8 sec. This time may be longer or shorter based on many factors and possible occurrence of network delays. One example that may lengthen the call setup time is the user interaction to answer the call, where the ringing process may take a few seconds.

Also in congested networks, such as in crowded venues and stadiums, high loading on the eNB may result in delaying the required radio resources to proceed with call setup. Such delays may result in a lapse of the RRC connection release timer prior to establishing the VoLTE call. When that happens, the UE will need to re-establish RRC connection to proceed with the call (and may even require the call setup procedure to be restarted). Re-establishing the RRC connection (and/or restarting the call setup procedure) results in additional delays and extra resource usage.

SUMMARY

The described features generally relate to one or more improved systems, methods, and/or apparatuses for call setup for a wireless communication device. During a call setup procedure, the device may implement a "keep alive" mechanism to maintain an RRC connection established as part of the call setup procedure. The "keep alive" mechanism may be configured to insert some padding traffic (e.g., dummy packets) to maintain the RRC connection, for example, by restarting the network RRC connection release timer to prevent its expiration and release of the RRC connection during call setup.

A method for voice over LTE (VoLTE) call setup for a wireless communication device is described. In one configuration, the method may involve initiating a VoLTE call setup procedure and establishing a radio resource control (RRC) connection as part of the VoLTE call setup procedure. A timer may be started based at least in part on the VoLTE call setup procedure. Upon expiration of the timer, at least one padding message may be transmitted to maintain the RRC connection for the VoLTE call setup procedure.

In some embodiments, the method may involve transmitting an Internet Protocol (IP) Multimedia Subsystem (IMS) message as part of the VoLTE call setup procedure. In such embodiments, the timer may be started upon transmission of the IMS message.

In some embodiments, the method may involve monitoring the VoLTE call setup procedure for IMS messages. In such embodiments, the timer may be restarted if an IMS message for the VoLTE call setup procedure is transmitted or received by the device.

In some embodiments, the method may involve receiving an RRC connection release message. When the device is waiting to receive a certain Internet Protocol (IP) Multimedia Subsystem (IMS) message upon receipt of the RRC connection release message, the device may transmit the at least one padding message.

In some embodiments, the method may involve setting a time period value of the timer based at least in part on a time period value of a timer associated with the RRC connection. Alternatively or additionally, the time period value of the timer may be set based at least in part on statistics of dropped or released RRC connections. Further, alternatively or additionally, the time period value of the timer may be set based at least in part on a stage of the VoLTE call setup procedure. In such embodiments, the setting may be accomplished by: setting a first time period value for the timer for a first stage of the VoLTE call setup procedure; and, setting a second time period value for the timer for a second stage of the VoLTE call setup procedure. The second time period value may be greater that the first time period value and the second stage may be later in the VoLTE call setup procedure than the first stage.

In some embodiments, the method may involve incrementing a counter upon expiration of the timer. In such embodiments, the timer may be restarted if the counter has not reached a determined maximum value by the incrementing. Further, the VoLTE call setup procedure may be monitored for IMS messages. In such embodiments, the timer may be restarted and the counter may be reset if an IMS message for the VoLTE call setup procedure is transmitted or received by the device.

In some embodiments, the maximum value of the counter may be determined based at least in part on statistics of dropped or released RRC connections. Alternatively or additionally. the maximum value of the counter may be determined based at least in part on a stage of the VoLTE call setup procedure. In such embodiments, the method may involve: determining a first maximum value of the counter for a first stage of the VoLTE call setup procedure; and, determining a second maximum value of the counter for a second stage of the VoLTE call setup procedure. The second maximum value may be greater that the first maximum value and the second stage may be later in the VoLTE call setup procedure than the first stage.

In some embodiments, the transmitting of the at least one padding message may be configured to reset an RRC connection timer associated with the VoLTE call setup procedure. Alternatively or additionally, transmitting the at least one padding message may involve transmitting at least one dummy packet.

An apparatus for VoLTE call setup for a wireless communications device is described. In one configuration, the apparatus may include means for initiating a VoLTE call setup procedure and means for establishing an RRC connection as part of the VoLTE call setup procedure. The apparatus may also include means for starting a timer based at least in part on the VoLTE call setup procedure and means for transmitting at least one padding message upon expiration of the timer to maintain the RRC connection for the VoLTE call setup procedure. In various embodiments, the apparatus may include means for performing some or all of the functions and/or operations of the method described above.

Another configuration of an apparatus for VoLTE call setup for a wireless communications device may include a processor and memory in electronic communication with the processor. The memory may embody instructions, which may be executable by the processor to: initiate a VoLTE call setup procedure; establish an RRC connection as part of the VoLTE call setup procedure; start a timer based at least in part on the VoLTE call setup procedure; and, transmit at least one padding message upon expiration of the timer to maintain the RRC connection for the VoLTE call setup procedure. In various embodiments, the apparatus may include instructions executable by the processor to perform some or all of the functions and/or operations of the method described above.

A computer program product is also described. The computer program product may be a non-transitory computer-readable medium storing instructions, which may be executable by a processor to: initiate a VoLTE call setup procedure; establish an RRC connection as part of the VoLTE call setup procedure; start a timer based at least in part on the VoLTE call setup procedure; and, transmit at least one padding message upon expiration of the timer to maintain the RRC connection for the VoLTE call setup procedure. In various embodiments, the computer program product may include instructions executable by the processor to perform some or all of the functions and/or operations of the method described above.

Another method for VoLTE call setup for a wireless communication device is described. In one configuration, the method may involve receiving a request from the device for setup of a VoLTE call and establishing a radio resource control (RRC) connection with the device based at least in part on the received request. A timer for the RRC connection may be started. The method may also involve receiving at least one padding message to maintain the RRC for VoLTE call setup. The timer may be extended upon receiving the at least one padding message.

In some embodiments, extending the timer may involve restarting the timer.

In some embodiments, the method may involve releasing the RRC connection upon expiration of the timer.

In some embodiments, the receiving of the at least one padding message may involve receiving at least one dummy packet.

In some embodiments, the method may involve receiving or transmitting an IMS message as part of a setup procedure for the VoLTE call. In such embodiments, the timer may be restarted upon receiving or transmitting the IMS message to maintain the RRC for VoLTE call setup.

Another apparatus for VoLTE call setup for a wireless communication device is described. In one configuration, the apparatus may include means for receiving a request from the device for setup of a VoLTE call and means for establishing an RRC connection with the device based at least in part on the received request. The apparatus may also include means for starting a timer for the RRC connection and means for receiving at least one padding message to maintain the RRC for VoLTE call setup. Further, the apparatus may include means for extending the timer upon receiving the at least one padding message. In various embodiments, the apparatus may include means for performing some or all of the functions and/or operations of the foregoing method.

Another configuration of an apparatus for VoLTE call setup for a wireless communications device may include a processor and memory in electronic communication with the processor. The memory may embody instructions, which may be executable by the processor to: receive a request from the device for setup of a VoLTE call; establish an RRC connection with the device based at least in part on the received request; start a timer for the RRC connection; receive at least one padding message to maintain the RRC for VoLTE call setup; and, extend the timer upon receiving the at least one padding message. In various embodiments, the apparatus may include instructions executable by the processor to perform some or all of the functions and/or operations of the foregoing method.

Another computer program product is described. The computer program product may be a non-transitory computer-readable medium storing instructions, which may be executable by a processor to: receive a request from the device for setup of a VoLTE call; establish an RRC connection with the device based at least in part on the received request; start a timer for the RRC connection; receive at least one padding message to maintain the RRC for VoLTE call setup; and, extend the timer upon receiving the at least one padding message. In various embodiments, the computer program product may include instructions executable by the processor to perform some or all of the functions and/or operations of the foregoing method.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
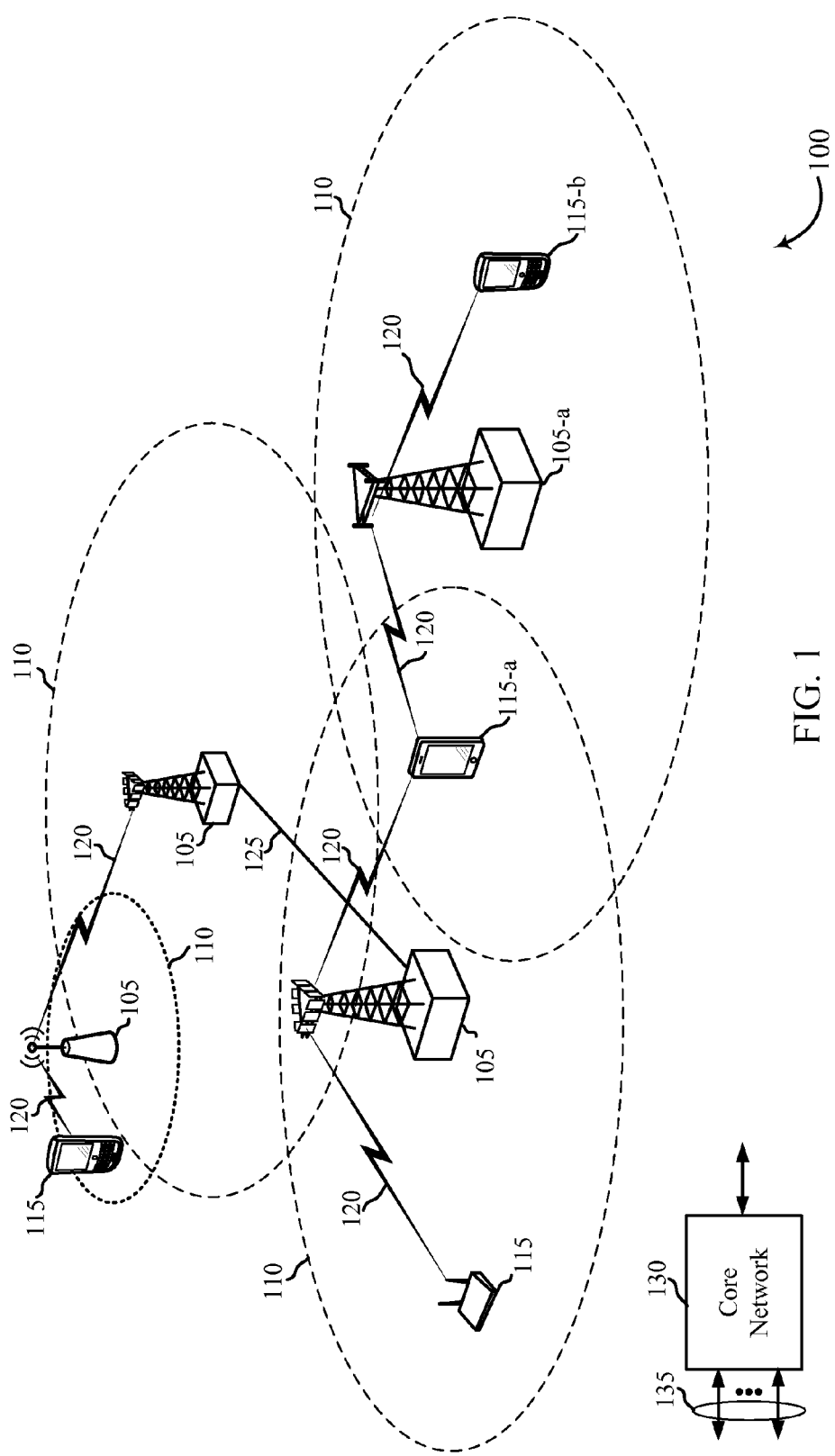
FIG. 1 shows an example wireless communications system diagram of mobile devices communicating with multiple base stations.

Described embodiments are directed to systems, methods, and apparatuses for implementing a keep alive mechanism at the IMS (IP Multimedia Subsystem) stack of a user equipment (UE). The keep alive mechanism may be configured to maintain an RRC connection for call setup. For example, the mechanism may be configured to cause the IMS stack to insert some padding traffic (e.g., dummy packets) to restart the network RRC connection release timer to prevent its expiration and release of the RRC connection during VoLTE call setup.

The keep alive mechanism may be controlled by a period timer and a counter. For example, after transmitting an initial IMS message during call setup, the IMS stack may start a timer T1, and may also increment a counter N1. If timer T1 lapses or expires, the IMS stack may send a padding message to maintain the RRC connection. For example, the padding message may be sent on the uplink (UL), so that the eNB assigns some UL resources, and extends or otherwise prevents an RRC connection release timer from expiring (e.g., the padding message/traffic may reset the RRC connection release timer).

Each time the timer T1 lapses/expires, the counter N1 may be incremented and the timer T1 may be restarted. This may continue until the counter N1 reaches a maximum configured value. If the counter N1 reaches its maximum configured value without the call setup being completed, the keep alive mechanism may be discontinued, and release of the RRC connection may be allowed to proceed conventionally (e.g., upon expiration of an RCC connection release timer at the base station).

In some embodiments, when a connection release message (e.g., notification or instruction) and the device is waiting to receive a certain Internet Protocol (IP) Multimedia Subsystem (IMS) message (e.g., response), the device may transmit at least one padding message. This may help the device to return to an RCC connected state for the VoLTE call setup sooner.

The timer T1 may be restarted and the counter N1 may be reset if the UE sends or receives an IMS message as part of the call setup procedure. Thus, the keep alive mechanism may be continued as the call setup procedure proceeds.

In some embodiments, the timer T1 and/or the counter N1 for the keep alive mechanism may be adaptive. For example, different time period values of the timer T1 (e.g., longer or shorter time periods) may be employed based on a current stage of the call setup procedure (e.g., early stage vs. later stage). This may allow the keep alive mechanism to maintain the RRC connection better as the likelihood of successful call setup increases as the UE advances through the call setup procedure. Alternatively or additionally, different maximum values of the counter N1 may be employed based on the current stage of the call setup procedure. In general, each IMS message may be considered to express or correspond to a different stage. A VoLTE call setup procedure may be divided into two categories: a call setup procedure that belongs to an RRC setup procedure; and, a call setup procedure that belongs to IMS call setup. The VoLTE call setup procedure may begin by establishing an RRC connection, followed by or interlaced with an IMS call flow.

In some embodiments, a time period value of the timer T1 and/or a maximum value of the counter N1 may be set based at least in part on statistics of dropped or released RRC connections. For example, the UE may be configured to compile statistics of its RRC connections that are unintentionally dropped (e.g., without completing an intended communication), or of RRC connections that are released prior to successful call setup. For example, the more frequently the UE suffers from dropped and/or released RRC connections, the shorter the time period value of the timer T1 may be set and/or the greater the maximum value of the counter N1 may be set.

In some embodiment, the time period value of the timer T1 may be set based on the value of the RRC connection timer. The RRC connection release timer is set in the eNB and may be different from one eNB to another. The UE may measure the RRC connection timer setting by measuring the time difference between the last message sent and receiving RRC connection release. For example, if a UE measures this time to be 10 sec., then the time period value of the timer T1 should be set shorter than 10 sec. to allow maintaining the RRC connection during call setup. If the UE moves to another eNB where the measured time is 4 sec., then the time period value of the timer T1 should be reduced to less than 4 sec. The time period value of the timer T1 and the maximum value of the counter N1 may be set such that the product (N*T) does not exceed a certain value. For example, the certain value of (N*T) may be 10, then when T is set to 10 the value N may be only a value of 1, which allows only one trial. When T is set to 5, then N value may be set to 2.

In some embodiments, the keep alive mechanism may be started at a certain point in the call setup. For example, the keep alive mechanism may be configured to be triggered when a certain message, other than the initial message, is sent for the call setup. Thus, the keep alive mechanism may avoid maintaining an RRC connection for calls that fail relatively early on in the call setup process.

Referring first to FIG. 1, an example wireless communication system 100 may include a plurality of UEs 115 that may communicate with a core network 130 via one or more base stations (or cells) 105. The base stations 105 may communicate with the UEs 115 under the control of a base station controller (not shown), which may be part of the core network 130.

Base stations 105 may communicate control information and/or user data with the core network 130 through backhaul links 135 (e.g., S1, etc.). In some embodiments, the base stations 105 may communicate, either directly or indirectly, with each other over backhaul links 125 (e.g., X2, etc.), which may be wired or wireless communication links. The wireless communication system 100 may support operation on multiple carriers (waveform signals of different frequencies). Multi-carrier transmitters can transmit modulated signals simultaneously on the multiple carriers. For example, each communication link 120 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some embodiments, the base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a first base station 105 may be divided into sectors making up only a portion of the coverage area (not shown). The wireless communication system 100 may include base stations 105 of different types (e.g., macro, micro, and/or pico base stations). There may be overlapping coverage areas for different technologies.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communication system 100, and each UE 115 may be stationary or mobile. A UE 115 may be ground based or located on an airborne vehicle. A UE 115 may also be referred to as a mobile device, a mobile station, a subscriber station, a mobile unit, a subscriber unit, a wireless unit, a remote unit, a UE, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a two-way radio, a radio cellular phone, a personal digital assistant (PDA), a wireless modem, a wireless communication device, a handheld device, a tablet computer, a laptop computer, a cordless phone, a wireless local loop (WLL) station, or the like.

The communication links 120 shown in wireless communication system 100 may include uplink (UL) and/or downlink (DL) transmissions from a UE 115 to base stations 105. The downlink transmissions may also be called forward link transmissions while the uplink transmissions may also be called reverse link transmissions. The communication links 120 may utilize different air interfaces of different radio access technologies (RATs).

In various embodiments described herein, a UE 115 may be configured to support voice communications with one or more other UEs 115. For example, if a user of UE 115-a wishes to call another user of UE 115-b, the user may control the UE 115-a to initiate a call setup procedure with a base station 105-a. Various messages may be sent and received between the UE 115-a and the base station 105-a as part of the call setup procedure.

As part of the call setup procedure, messages between the UE 115-a and the base station 105-a may establish a radio resource control (RRC) connection. As discussed above, the base station 105-a may implement an RRC connection release or inactivity timer. This timer may be started by the base station 105-a when the RRC connection is established, for example. As described herein, the base station 105-a may monitor the call setup procedure for call setup messages (sent by the base station 105-a, received by the base station 105-a, or both). Each call setup message may trigger the base station 105-a to reset or otherwise extend the RRC connection inactivity timer. If sufficient time passes between call setup messages, the timer may expire and the base station 105-a may release the RRC connection as a result.

In some instances, a delay may occur in the call setup process without intending to discontinue the call setup. Thus, the UE 115-a may implement a keep alive mechanism to maintain the RRC connection for call setup in spite of delays that may otherwise cause the RRC connection to be released. The keep alive mechanism may be configured to cause the UE 115-a to send some padding traffic or message(s) (e.g., dummy packets) to the base station 105-a. The padding traffic/message(s) may be configured to cause the base station 105-a to restart (or extend) its RRC connection inactivity timer. For example, the padding traffic/message(s) may be configured such that the base station 105-a recognizes or otherwise treats the padding traffic/message(s) as call setup message(s).

Figure 2:
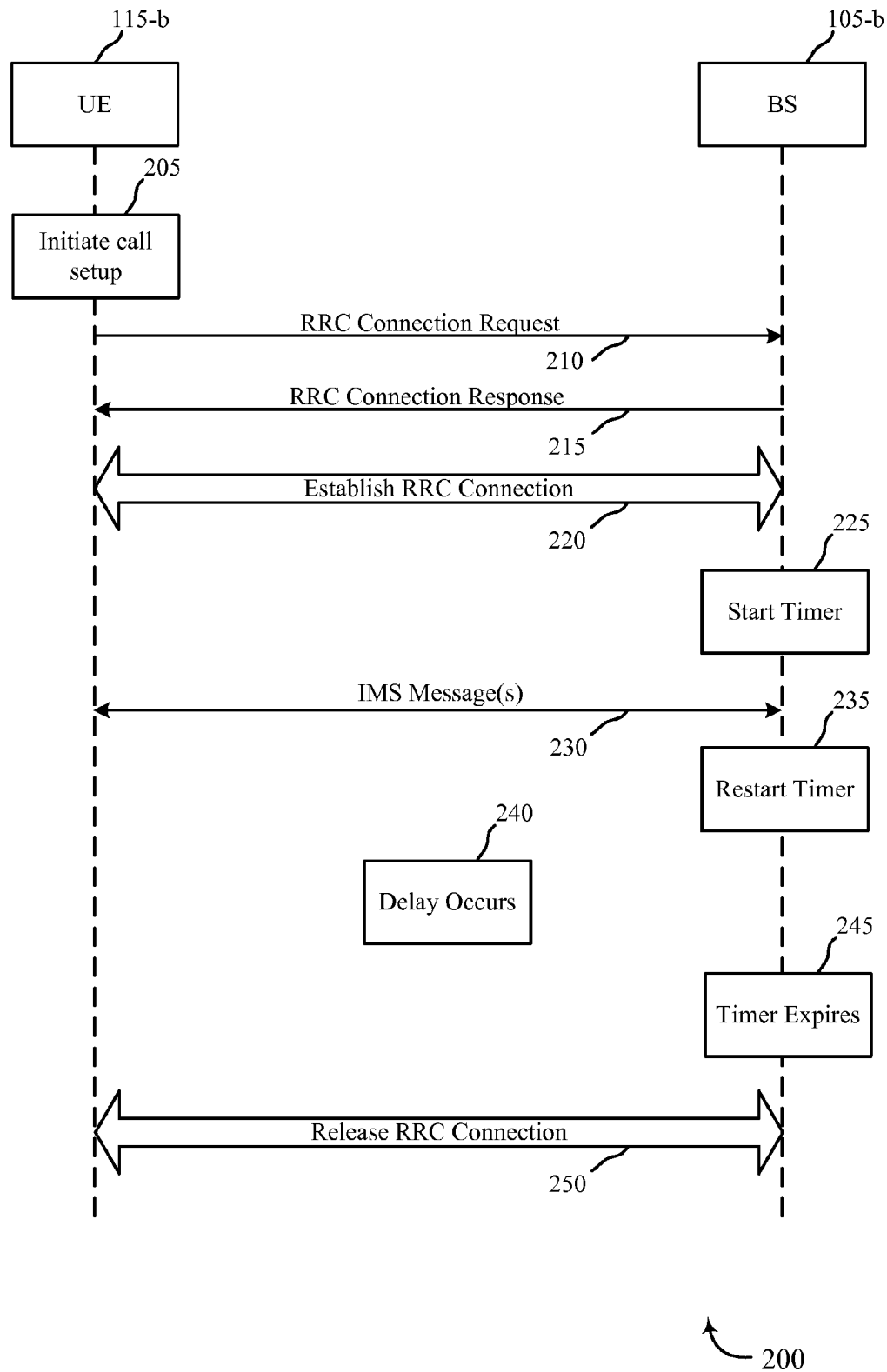
FIG. 2 shows a communication flow diagram according to a call setup procedure in which delay causes the RRC connection to be released.

Turning now to FIG. 2, a communication flow diagram 200 according to one example of a call setup procedure (e.g., for VoLTE) is shown. In this example, a UE 115-b may be operated to initiate a call setup at block 205. For example, a user may dial a number or select a contact to call using the UE 115-b. The UE 115-b may send an RRC connection request 210 to a base station (BS) 105-b as part of the call setup procedure. In return, the BS 105-b may send an RRC connection response 215 to the UE 115-b. Although a simplified request and response is shown, it should be understood that various communications and/or negotiations between the UE 115-b and the BS 105-b may occur to establish an RRC connection 220. The BS 105-b may be an example of the BSs 105 illustrated in FIG. 1. The UE 115-b may be an example of the UEs 115 illustrated in FIG. 1.

Once the RRC connection has been established between the BS 105-b and the UE 115-b, the BS 105-b may start an RRC connection inactivity timer at block 225. The BS 105-b may then monitor the call setup procedure for messages associated with the call setup procedure. In the case of VoLTE call setup, the messages may be IMS (IP Multimedia Subsystem) messages. Such messages sent by the UE 115-b and received by the BS 105-b or sent by the BS 105-b and received by the UE 115-b may indicate that the call setup procedure is progressing. As such, if the BS 105-b sends or receives such a message, the BS 105-b may restart the timer at block 235 to maintain the RRC connection for the call setup procedure (e.g., to prevent release of the RRC connection upon lapse or expiration of the timer).

Although block 235 indicates that the timer is restarted, it should be understood that the timer may be otherwise extended so as not to expire after elapse of the original period of the timer. For example, rather than restarting the timer, additional time may be added to the timer each time a call setup message is sent and/or received, as appropriate or desired. In either case, the timer may be restarted/extended as long as the call setup procedure is progressing.

However, if a sufficient delay occurs between call setup messages at block 240, the timer may expire at block 245. For example, if a call setup message is sent by the BS 105-*b* but is not received by the UE 115-*b* for some reason (channel congestion, transport delay, etc.), or vice versa, both the BS 105-*b* and the UE 115-*b* may be waiting on each other for a further message. In such case, sufficient time may pass before either the BS 105-*b* or the UE 115-*b* attempts to send another call setup message and the timer may expire.

The BS 105-*b* may be configured to release the RRC connection 250, or communicate with the UE 115-*b* to release the connection, if the timer expires. At this point, the UE 115-*b* will need to re-establish an RRC connection procedure with the desired call setup, or may even have to restart the entire call setup procedure. Thus, it may be desirable to implement a "keep alive" mechanism to maintain the RRC connection when such delays occur.

Figure 3A:
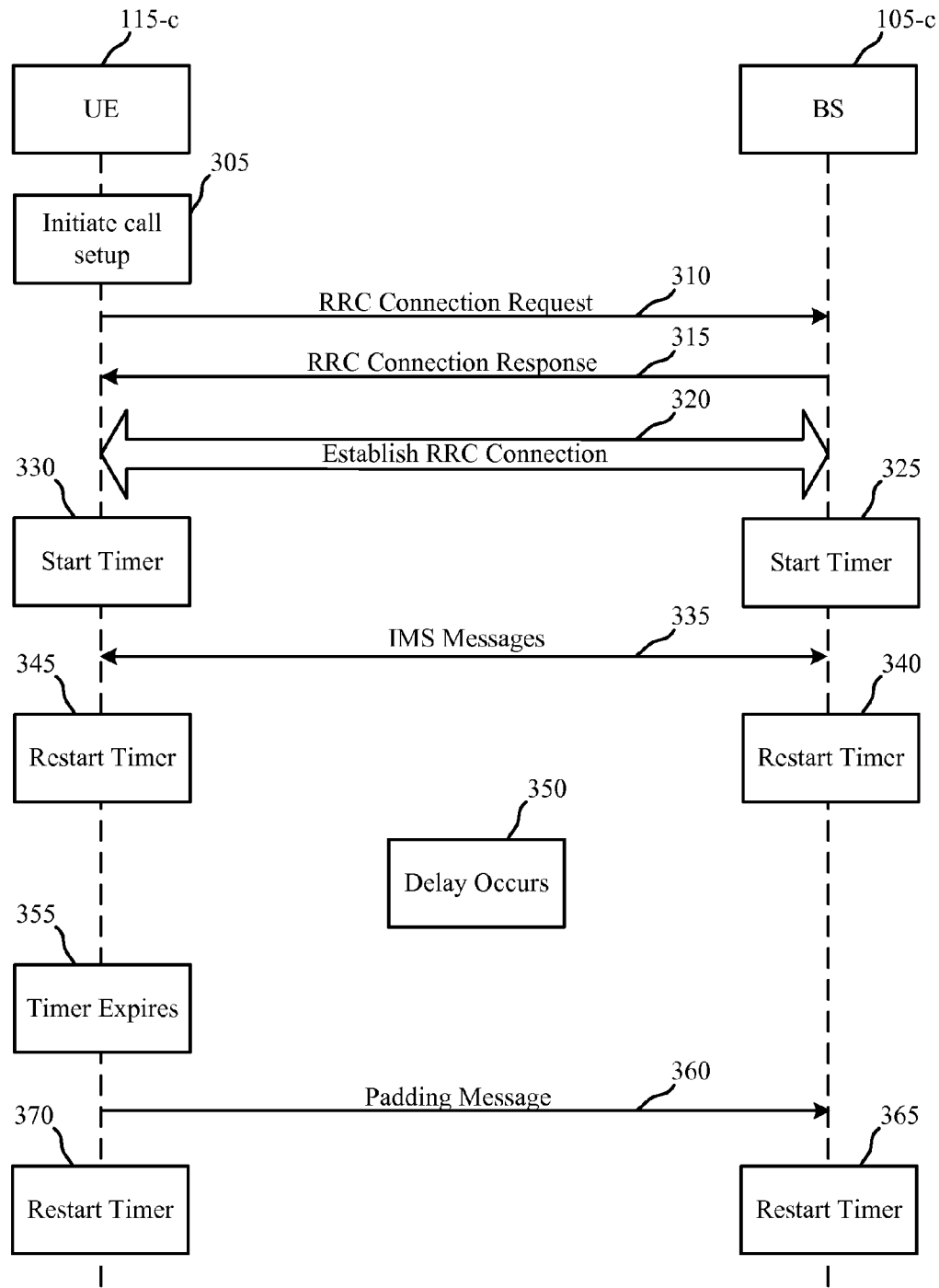
FIG. 3A shows a communication flow diagram according to a call setup procedure implementing an example of a keep alive mechanism for the RRC connection.

FIG. 3A shows a communication flow diagram 300-*a* according to a call (e.g., VoLTE) setup procedure implementing one example of a "keep alive" mechanism for the RRC connection. As above, a UE 115-*c* may be operated to initiate a call setup at block 305. The UE 115-*c* may send an RRC connection request 310 to a base station (BS) 105-*c* as part of the call setup procedure. In return, the BS 105-*c* may send an RRC connection response 315 to the UE 115-*c*. Based on the request 310 and the response 315 (and any other suitable communications or negotiations), an RRC connection 320 may be established between the UE 115-*c* and the BS 105-*c*. The BS 105-*c* may be an example of the BSs 105 illustrated in FIGS. 1 and/or 2. The UE 115-*c* may be an example of the UEs 115 illustrated in FIGS. 1 and/or 2.

Once the RRC connection has been established, the BS 105-*c* may start an RRC connection inactivity timer at block 325. Also, the UE 115-*c* may start a "keep alive" timer at block 330. In some embodiments, the UE 115-*c* may start its timer when it initiates the call setup procedure, for example, when the UE 115-*c* sends an initial call setup message (which may be the RRC connection request 310). In other embodiments, the UE 115-*c* may start the "keep alive" timer when the RRC connection is established, for example, upon receiving a call setup message that confirms the RRC connection or upon sending or receiving a certain call setup message (e.g., the first call setup message after the RRC connection is established).

In some embodiments, the UE 115-*c* may start its timer once the call setup procedure has progressed sufficiently. For example, the call setup procedure may have multiple stages (e.g., identifiable by specific call setup messages that are sent and/or received). It may be desirable to implement the keep alive mechanism only once a certain stage in the call setup procedure has been successfully reached. This may avoid maintaining the RRC connection (beyond the time period of the RRC connection inactivity timer set by the BS 105-*c*) for calls that would otherwise fail at an early stage or early stages.

As above, the BS 105-*c* may then monitor the call setup procedure for messages associated with the call setup procedure. The UE 115-*c* may also monitor the call setup procedure for messages associated with the call setup procedure. In the case of VoLTE call setup, the messages may be IMS messages. Each time the BS 105-*c* sends and/or receives a call setup message, the BS 105-*c* may restart its timer at block 340 to maintain the RRC connection for the call setup procedure (e.g., to prevent release of the RRC connection upon lapse or expiration of the timer). Although block 340 indicates that the RRC connection inactivity timer is restarted, it should be understood that the timer may otherwise be extended so as not to expire after elapse of the original period of the timer, such as discussed above.

The UE 115-*c* may also restart its timer at block 345 each time the UE 115-*c* sends and/or receives a call setup message. Thus, while the call setup procedure progresses (e.g., as indicated by the call setup messages), both timers may be restarted again and again.

If a sufficient delay occurs between call setup messages at block 350, the "keep alive" timer may expire at block 355. However, in this example, the UE 115-*c* may send one or more padding messages 360 to the BS 105-*c* upon expiration of the "keep alive" timer. Upon receipt of the padding message(s), the BS 105-*c* may restart or otherwise extend the RRC connection inactivity timer at block 365. In some embodiments, the padding message(s) may be one or more dummy packets that may have a same or similar format as call setup messages but do not contain instructions or information for use in the call setup procedure other than to restart/extend the RRC connection inactivity timer. The UE 115-*c* may restart its timer at block 370 upon sending the padding message(s). As such, the padding message(s) may be configured to act as a substitute for a call setup message to keep the RRC connection alive for the call setup procedure. As a result, the BS 105-*c* and the UE 115-*c* may treat the padding message(s) the same as any other call setup message for resetting their respective timers even though the call setup itself is not affected by the padding message(s).

As illustrated in FIG. 3A, a period or time period value of the "keep alive" timer set by the UE 115-*c* may be less than the period or time period value of the RRC connection inactivity timer so that the padding message(s) may be received by the BS 105-*c* prior to expiration of the RRC connection inactivity timer. Thus, the time period value of the "keep alive" timer may be based at least in part on the time period value of the RRC connection inactivity timer. The RRC connection inactivity timer value may be measured or otherwise determined by the UE 115-*c* in any suitable manner. For example, the base station 105 may communicate the value of its RRC connection inactivity timer to the UE 115-*c*.

According to the communication flow of FIG. 3A, the release of the RRC connection 250 illustrated in FIG. 2 may be avoided by restarting the RRC connection inactivity timer prior to its expiration. Absent the "keep alive" mechanism of FIG. 3A, the delay at block 350 may have resulted in expiration of the RRC connection inactivity timer and release of the RRC connection.

Figure 3B:
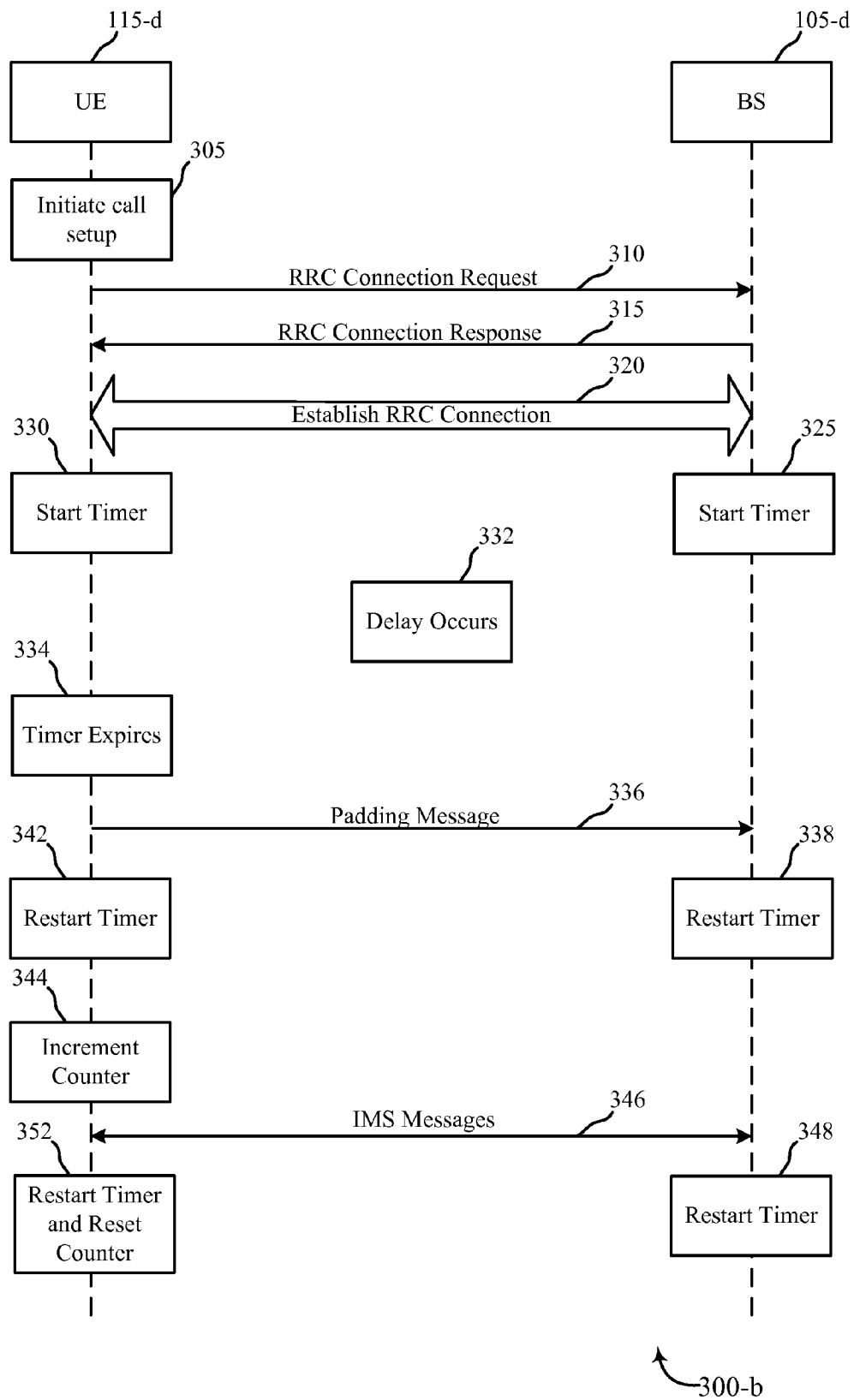
FIG. 3B shows a communication flow diagram according to a call setup procedure implementing another example of a keep alive mechanism for the RRC connection.

FIG. 3B shows a communication flow diagram 300-*b* according to a call (e.g., VoLTE) setup procedure implementing another example of a "keep alive" mechanism for the RRC connection. As above, a UE 115-*d* may be operated to initiate a call setup at block 305. The UE 115-*d* may send an RRC connection request 310 to a base station (BS) 105-*d* as part of the call setup procedure. In return, the BS 105-*d* may send an RRC connection response 315 to the UE 115-*d*.

Based on the request 310 and the response 315 (and any other suitable communications or negotiations), an RRC connection 320 may be established between the UE 115-*d* and the BS 105-*d*. The BS 105-*b* may be an example of the BSs 105 illustrated in FIGS. 1, 2 and/or 3A. The UE 115-*d* may be an example of the UEs 115 illustrated in FIGS. 1, 2, and/or 3A.

Once the RRC connection has been established, the BS 105-*d* may start an RRC connection inactivity timer at block 325. Also, the UE 115-*d* may start a "keep alive" timer at block 330. The BS 105-*d* and the UE 115-*d* may then monitor the call setup procedure for messages associated with the call setup procedure. Thus far, the communications flow may be the same as depicted and described above with respect to FIG. 3A.

However, in this example, delay occurs at block 332 between the establishment of the RRC connection 320 and a subsequent call setup message. If the delay at block 332 is sufficient, the "keep alive" timer may expire at block 334. The UE 115-*d* may send one or more padding messages (e.g., dummy packets) 336 to the BS 105-*d* upon expiration of the "keep alive" timer. Upon receipt of the padding message(s), the BS 105-*d* may restart or otherwise extend the RRC connection inactivity timer at block 338. The UE 115-*d* may restart its timer at block 342 upon sending the padding message(s). Further, the UE 115-*d* may increment a counter at block 344.

As above, the period of the "keep alive" timer set by the UE 115-*d* may be less than the period of the RRC connection inactivity timer so that the padding message(s) may be received by the BS 105-*d* prior to expiration of the RRC connection inactivity timer. In this manner, the release of the RRC connection 250 illustrated in FIG. 2 may be avoided by resetting the RRC connection inactivity timer prior to its expiration. Absent the "keep alive" mechanism of FIG. 3B, the delay at block 332 may have resulted in expiration of the RRC connection inactivity timer and release of the RRC connection.

If sufficient further delay occurs (not shown), the "keep alive" timer may expire again, causing the padding message(s) to be sent, the RRC connection inactivity timer and the "keep alive" timer to be restarted, and the counter to be incremented again. If sufficient delay continues, this may be repeated until the counter reaches a maximum value. If the counter reaches its maximum value, then the "keep alive" mechanism may be discontinued, for example, by not restarting the "keep alive" timer.

On the other hand, as illustrated in FIG. 3B, a call setup message (e.g., IMS message for VoLTE) 346 may be sent/received by the UE 115-*d* and/or the BS 105-*d* prior to expiration of the "keep alive" timer. In other words, the call setup procedure (call setup message(s)) may continue without sufficient further delay for the "keep alive" timer to expire. Upon sending and/or receiving the message 346, the BS 105-*d* may restart the RRC connection inactivity timer at block 348 to maintain the RRC connection for the call setup procedure (e.g., to prevent release of the RRC connection upon lapse or expiration of the timer). The UE 115-*d* may also restart its timer and reset its counter at block 352 each time the UE 115-*d* sends and/or receives a call setup message. Thus, while the call setup procedure progresses (e.g., as indicated by the call setup messages), both timers may be restarted and the counter may be reset again and again.

It should be understood that the particular communication flows illustrated in FIGS. 3A and 3B are only examples for the sake of clarity in this description. Thus, other communication flows are possible. For example, additional communication flows may be envisioned in view of the various flowcharts described below.

Figure 4A:
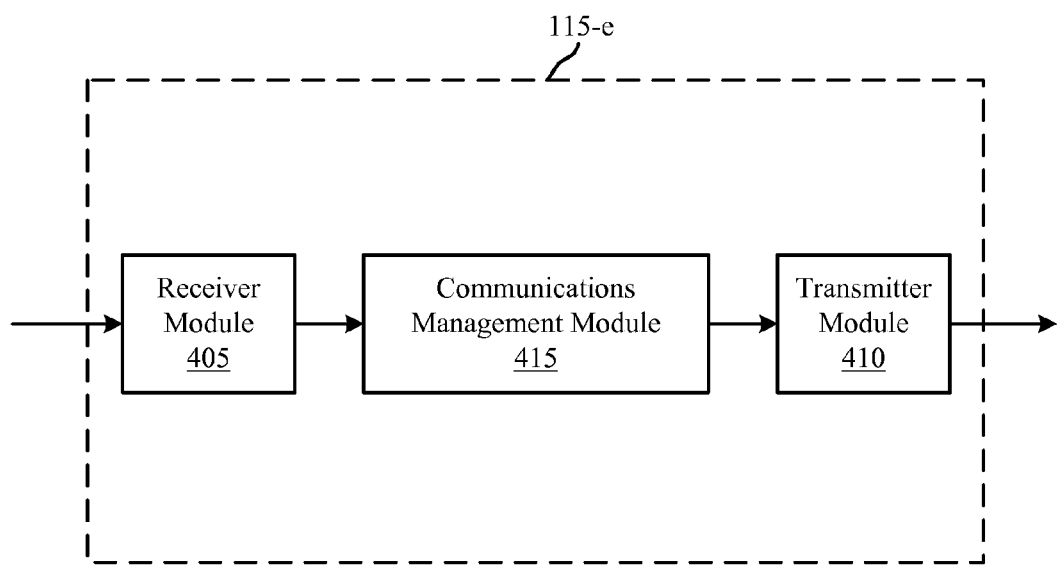
FIG. 4A shows a block diagram of an example of a user equipment (UE)

FIG. 4A shows a block diagram 400-*a* of an example of a user equipment (UE) 115-*e*. The UE 115-*e* may be an example of one or more aspects of a UE 115 described with reference to FIGS. 1, 2, 3A and/or 3B. The UE 115-*e* may include a receiver module 405, a transmitter module 410 and a communications management module 415. The UE 115-*e* may also include a processor (not shown), which may be part of the communications management module, for example. Each of these components may be in communication with each other.

The receiver module 405 may receive information such as packets, user data, and/or control information including synchronization and pilot signals. The received information may be demodulated, descrambled, de-interleaved, and/or decoded. The information may be passed on to the communications management module 415, and to other components of the UE 115-*e* as appropriate or desired.

The receiver module 405 may include a single receiver or multiple receivers. For example, the receiver module 405 may include N receive antennas and R RF chains (not shown), where R is generally less than or equal to N. Each RF chain may include an RF module and an analog-to-digital converter (ADC). During operation, signals received by a receive antenna may be provided to an input of an RF chain. At the RF chain, the signals are processed (e.g., amplified, downconverted, filtered, etc.) by an RF module and digitized by the ADC. The output of the RF chain may be provided to the demodulator for further processing. The demodulator may combine signals received from multiple antennas using receive diversity techniques to increase the SINR of the received signals. The demodulator may use a suitable signal combining technique such as equal gain combining, maximum ratio combining (MRC), and the like. The demodulator and RF chains may use interference cancellation techniques to further provide interference cancellation and/or suppression (e.g., interference rejection combining, successive interference cancellation, and the like).

The transmitter module 410 may transmit information such as packets, user data, and/or control information including synchronization and pilot signals. The transmitted information may be modulated, scrambled, interleaved, and/or coded. The information may be received from the communications management module 415, and from other components of the UE 115-*e* as appropriate or desired. In some embodiments, the transmitter module 410 may be collocated with the receiver module 405 in a transceiver module (not shown). The transmitter module 410 may include a single antenna, or it may include a plurality of antennas. The communications management module 415 may employ the transmitter module 410 and the receiver module 405 (or a transceiver module) to perform a call setup procedure (including establishment of an RRC connection) by communicating with a base station as described herein.

Further, the communications management module 415 may employ the transmitter module 410 and the receiver module 405 to implement aspects of a "keep alive" mechanism as described herein. For example, the communications management module 415 may be configured to monitor a call setup procedure (e.g., for VoLTE call setup) for messages (e.g., IMS messages) associated with the call setup procedure via the transmitter module 410 and/or the receiver module 405. The communications management module 415 may also be configured to send one or more padding messages via the transmitter module 410 in accordance with the "keep alive" mechanism to maintain an RRC connection for call setup.

The communications management module 415 may also implement a timer and/or a counter (or the functionality thereof) to carry out aspects of a "keep alive" mechanism as described herein. As such, the communications management module 415 may set one or more time period values and/or maximum values, and may be configured to start, restart, increment and/or reset, as described herein.

Figure 4B:
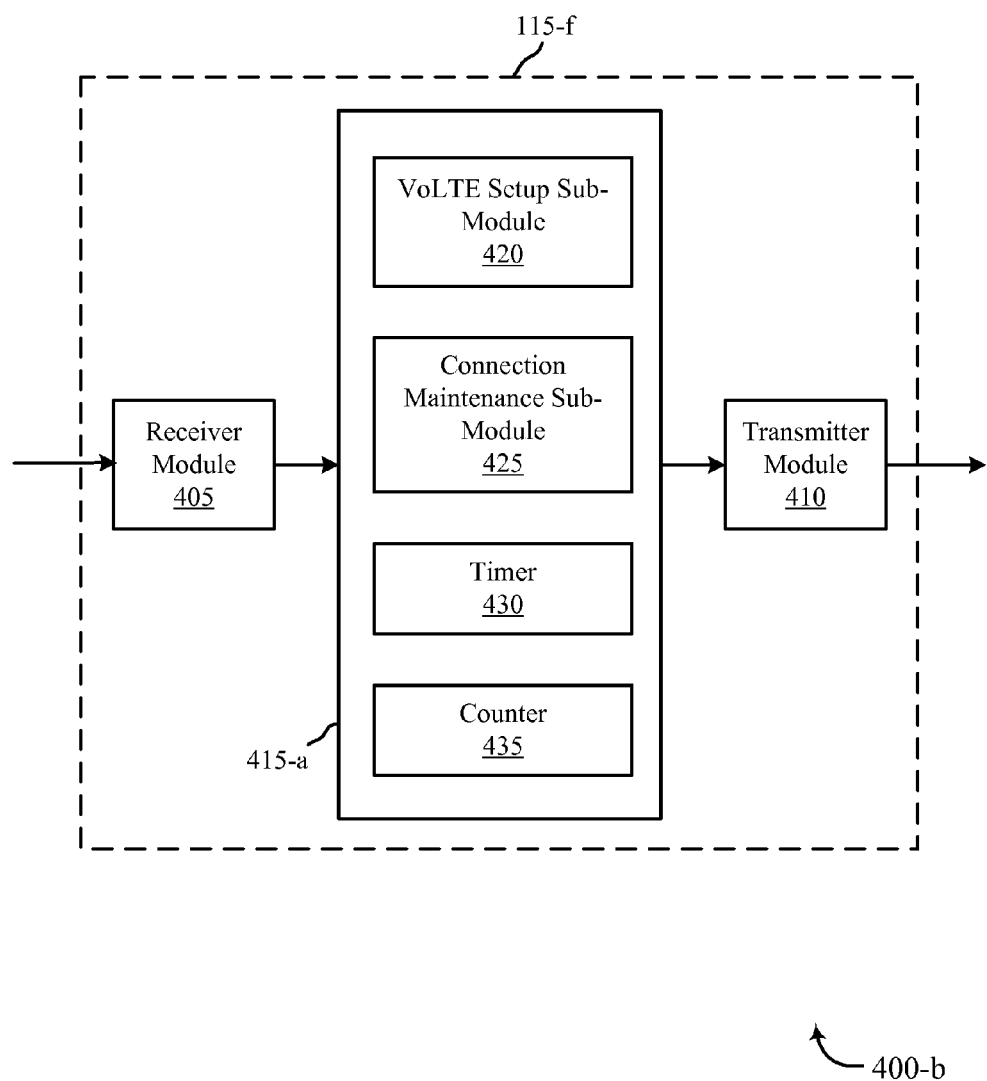
FIG. 4B shows a block diagram of another example of a UE.

FIG. 4B shows a block diagram 400-b of an example of a UE 115-f. The UE 115-f may be an example of one or more aspects of a UE 115 described with reference to FIGS. 1, 2, 3A, 3B and/or 4A. The UE 115-f may include a receiver module 405, a transmitter module 410 and a communications management module 415-a. The UE 115-f may also include a processor (not shown), which may be part of the communications management module, for example. Each of these components may be in communication with each other.

The receiver module 405 and the transmitter module 410 may be configured and may be employed as described above with respect to FIG. 4A. The communications management module 415-a may be configured and may implement operations as described above with respect to the communications management module 415 of FIG. 4A.

Further, as illustrated in FIG. 4B, the communications management module 415-a may include a VoLTE setup sub-module 420 for performing a call setup procedure, including requests, responses and other communications (e.g., IMS messages). The call set up procedure may be any know or hereafter developed procedure by which a wireless communications device may establish voice communications.

The communications management module 415-a may include a connection maintenance sub-module 425 for performing operations to implement aspects of a "keep alive" mechanism as described herein. For example, the connection maintenance sub-module 425 may be configured to monitor a call setup procedure for messages associated with the Japanese Patent Application No. 2011-527577 (International Publication No. 2011/021379

As shown in FIG. 4B, the communications management module 415-a may also include a timer 430 and a counter 435. However, the timer 430 and/or the counter 435 may not be part of the communications management module 415-a and may be separate components of the UE 115-f. In any case, the connection maintenance sub-module 425 may be configured to control the timer 430 (e.g., start and restart) and set the time period value(s) thereof. Similarly, the connection maintenance sub-module 425 may be configured to control the counter 435 (e.g., increment and reset/zero) and set the maximum value(s) thereof.

Figure 4C:
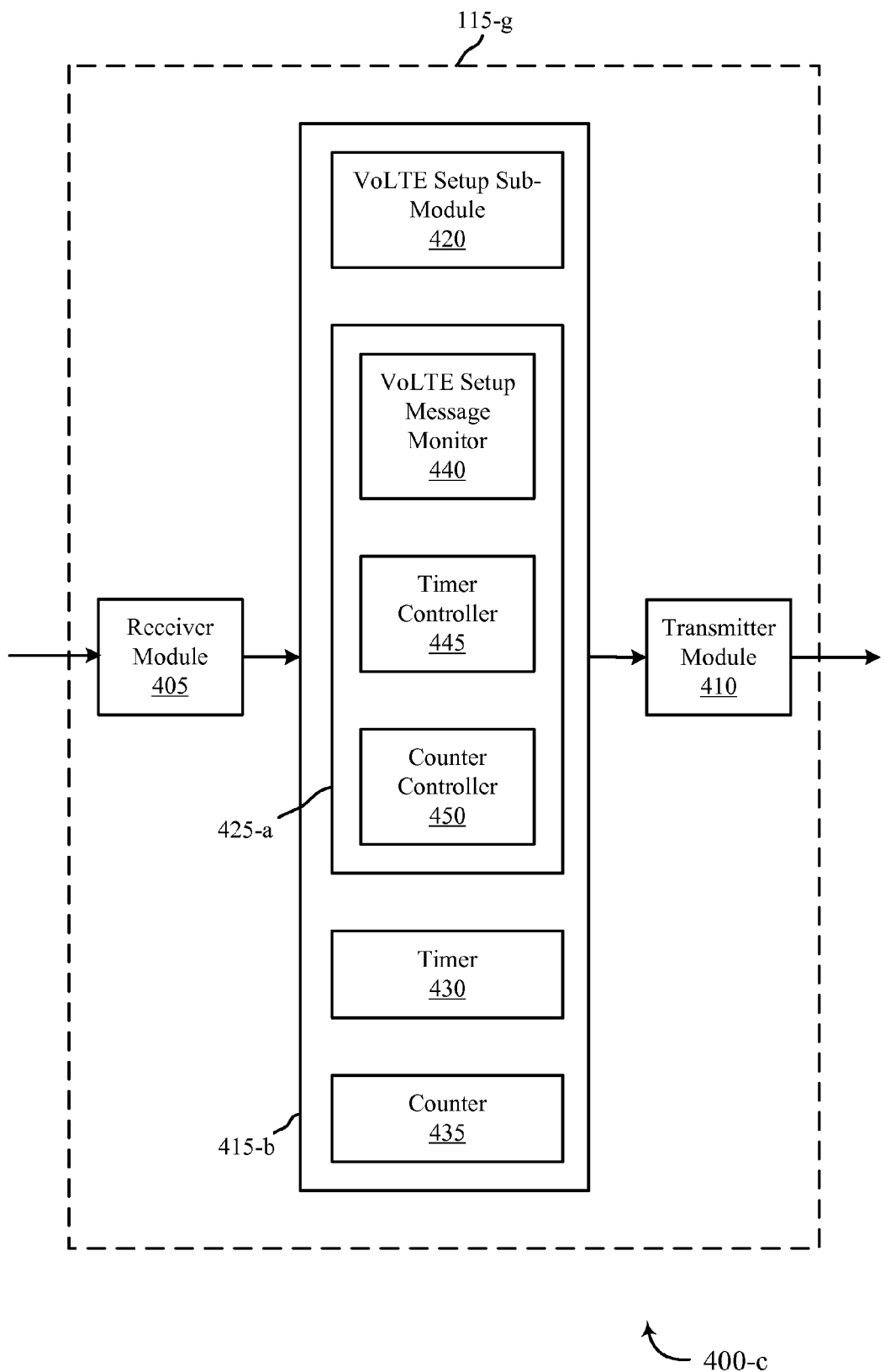
FIG. 4C shows a block diagram of yet another example of a UE.

FIG. 4C shows a block diagram 400-c of an example of a UE 115-g. The UE 115-g may be an example of one or more aspects of a UE 115 described with reference to FIGS. 1, 2, 3A, 3B, 4A and/or 4B. The UE 115-g may include a receiver module 405, a transmitter module 410 and a communications management module 415-b. The UE 115-g may also include a processor (not shown), which may be part of the communications management module, for example. Each of these components may be in communication with each other.

The receiver module 405 and the transmitter module 410 may be configured and may be employed as described above with respect to FIG. 4A. The communications management module 415-b may be configured and may implement operations as described above with respect to the communications management module 415 of FIG. 4A and/or as described above with respect to the communications management module 415-a of FIG. 4B. Thus, in some embodiments the communications management module 415-b may include a VoLTE setup sub-module 420, a timer 430 and a counter 435, which may be configured and may implement operations as described above with respect to FIG. 4B.

Further, the communications management module 515-b may include a connection maintenance sub-module 425-a. The connection maintenance sub-module 425-a, as illustrated in FIG. 4C, may include a VoLTE setup message monitor 440, a timer controller 445 and a counter controller 450. The VoLTE setup message monitor 440 may be configured or otherwise controlled by the connection maintenance sub-module 425-a and/or the communications management module 515-b to detect or otherwise determine if a call setup message (e.g., IMS message) is transmitted and/or received by the UE 115-g. For example, each IMS message has its own header that describes the message and its fields, and may be identified at the application layer by the header. Also, IMS messages are received with a specific profile, which has a QoS Class Identifier (QCI) with value 1. Thus, messages that are carried with QCI1 profile are likely to be IMS messages. As such, the QCI profile also may be used to determine if a certain message qualifies to start/restart/reset the timer 430 or the counter 435. For example, messages carried on other profiles may not be monitored. The timer controller 445 and the counter controller 450 may be configured or otherwise controlled by the connection maintenance sub-module 425-a and/or the communications management module 515-b to operate the timer 430 and the counter 435, respectively (e.g., start, restart, set time period value(s), increment, reset, set maximum value(s)).

Figure 5:
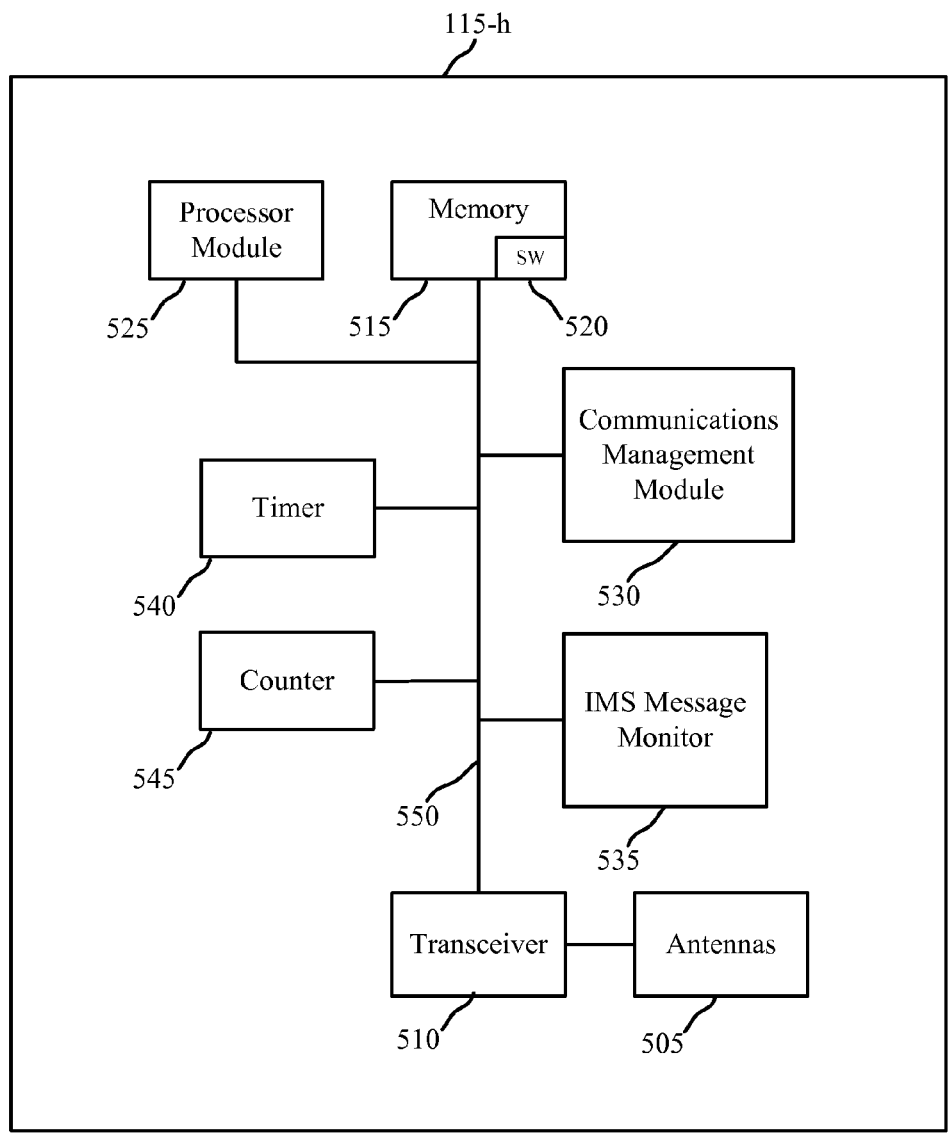
FIG. 5 shows a block diagram of a configuration for implementing a UE.

FIG. 5 shows a block diagram 500 of a configuration for implementing a UE 115-h. The UE 115-h may be an example of one or more aspects of a UE 115 described with reference to FIGS. 1, 2, 3A, 3B, 4A, 4B and/or 4C. The UE 115-h may include one or more antennas 505 configured to receive and transmit wireless signals in cooperation with one or more transceiver modules 510. The UE 115-h may further include a communications management module 530, an IMS message monitor 535, a timer 540, a counter 545, a processor module 525, and a memory 515, each of which may be in communication, directly or indirectly, with each other (e.g., over one or more buses 550).

The transceiver module 510 may be configured to communicate, via the antenna(s) 505, with other UEs and/or base stations of one or more networks under control by the communications management module 530. Thus, the transceiver module 510 or transceiver may be means for sending, transmitting, receiving and/or obtaining, alone or in combination with the various other modules of the UE 115-h and/or the antenna(s) 505. The transceiver module 510 may include a modem configured to modulate the packets and provide the modulated packets to the antenna(s) 505 for transmission, and to demodulate packets received from the antenna(s) 505.

The memory 515 may include random access memory (RAM) and read-only memory (ROM). The memory 515 may also store computer-readable, computer-executable software code 520 containing instructions that are configured to, when executed, cause the processor module 525 to perform various functions described herein (e.g., call setup procedure, initiating, establishing, monitoring, detecting, determining, starting, restarting, setting, incrementing, resetting, sending/transmitting, receiving, controlling, etc.).

Alternatively, the software code 520 may not be directly executable by the processor module 525, but may be configured to cause a computer, e.g., when compiled and executed, to perform functions described herein. Thus, the processor module 525 or processor may be means for initiating, establishing, starting, transmitting, monitoring restarting, setting, incrementing, resetting, determining, etc., alone or in combination with the memory 515 and the software code 520. The processor module 525 may include an intelligent hardware device, e.g., a central processing unit (CPU), a microcontroller, an application-specific integrated circuit (ASIC), etc.

The IMS message monitor 535 may be configured to perform various monitoring, detecting or determining operations as described herein. The IMS message monitor 535 may perform such operations in conjunction with the transceiver 510 and the antenna(s) 505. Further, the IMS message monitor 535 may operate to under the control of the communications management module 530 and/or the processor module 525.

The timer 540 and the counter 545, respectively, may be any known or hereafter developed hardware and/or software that is capable of providing the functionality thereof as described herein. The timer 540 and the counter 545 may perform various operations in conjunction with the IMS message monitor 535 and/or the communications management module 530. Further, the timer 540 and the counter 545 may operate under the control of IMS message monitor 535, the communications management module 530 and/or the processor module 525.

The communications management module 530 may be an example of the communications management modules 415 of FIGS. 4A, 4B, and/or 4C, and may implement the functionality for these modules described above. Although the communications management module 530 is shown separately, the functionality of the communications management module 530 may be implemented as a component of the transceiver module 510, as a computer program product, and/or as one or more controller elements of the processor module 525. Similarly, the IMS message monitor 535 may be implemented as components of the transceiver module 510, as a computer program product, and/or as one or more controller elements of the processor module 525.

The components of the UEs 115-*e*, 115-*f*, 115-*g*, or 115-*h* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-*e*, 115-*f*, 115-*g*, or 115-*h*.

Figure 6:
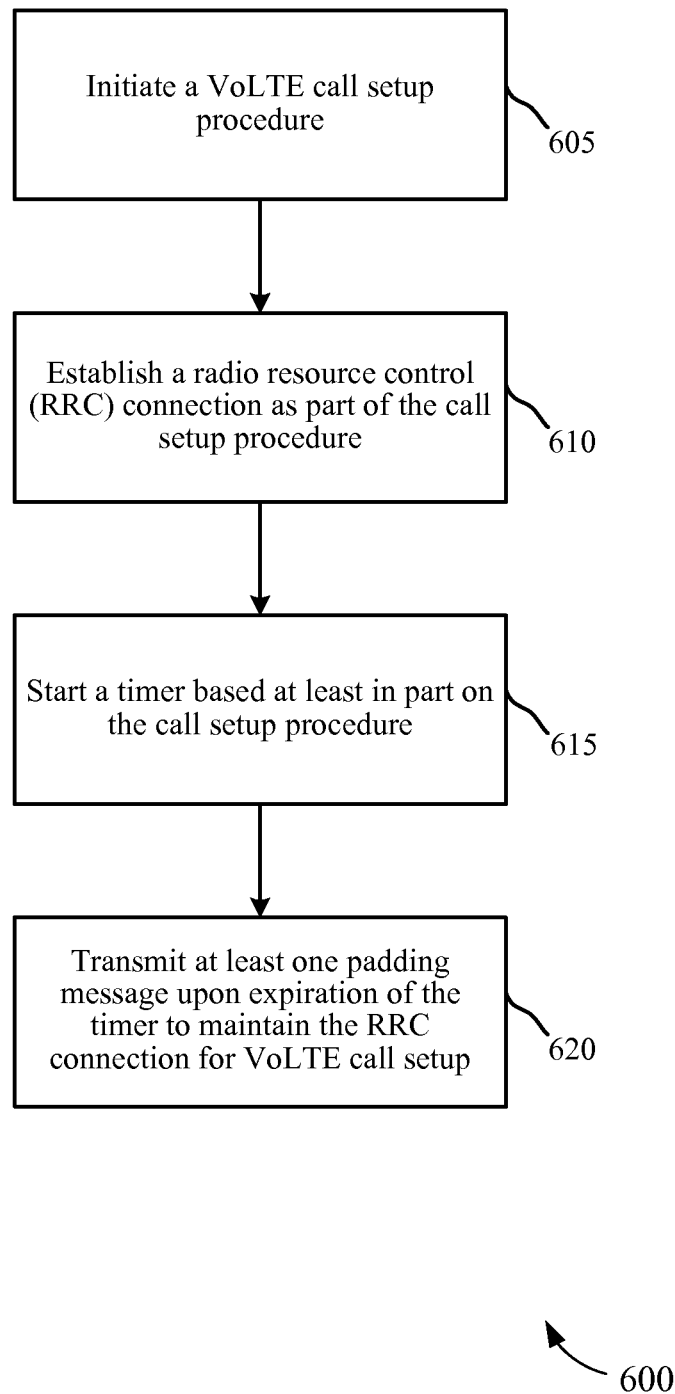
FIG. 6 is a flowchart of a method for call setup for a wireless communications device.

FIG. 6 is a flowchart of a method 600 for call setup for a wireless communications device. For clarity, the method 600 is described below with reference to aspects of one or more of the UEs 115 described with reference to FIGS. 1, 2, 3A, 3B, 4A, 4B, 4C and/or 5. In one implementation, a UE 115 or a processor module thereof may execute one or more sets of codes to control the functional elements of the UE 115 to perform the functions described below.

At block 605, the UE 115 may initiate a VoLTE call procedure. As described herein, this may be in response to user input, such as entering a telephone number to call. Next, the UE 115 may establish a radio resource control (RRC) connection as part of the call setup at block 610. As described herein, this may involve messages and/or negotiating with a base station to establish the RRC connection therewith.

The UE 115 may start a timer at block 615 based at least on the call setup procedure. As described herein, the UE 115 may start the timer when the call setup procedure is initiated, when the RRC connection is established, or when a particular call setup message occurs in the call setup procedure (e.g., is sent or received). For example, the timer may be started when a Session Initiation Protocol (SIP):Invite message is sent or when SIP:Ring is received. Moreover, an RRC message, such as an RRC Connection Request, with certain reason (for example, conversational call) may be selected as well for starting the timer.

Then, at block 620, the UE 115 may transmit at least one padding message to the base station upon expiration of the timer to maintain the RRC connection for VoLTE call setup. As described herein, the padding message(s) may be one or more dummy packets and may be configured to trigger the base station to restart (or extend) a RRC connection inactivity timer so that the RRC inactivity timer does not expire and the base station does not release the RRC connection or otherwise cause the RRC connection to be released.

Figure 7:
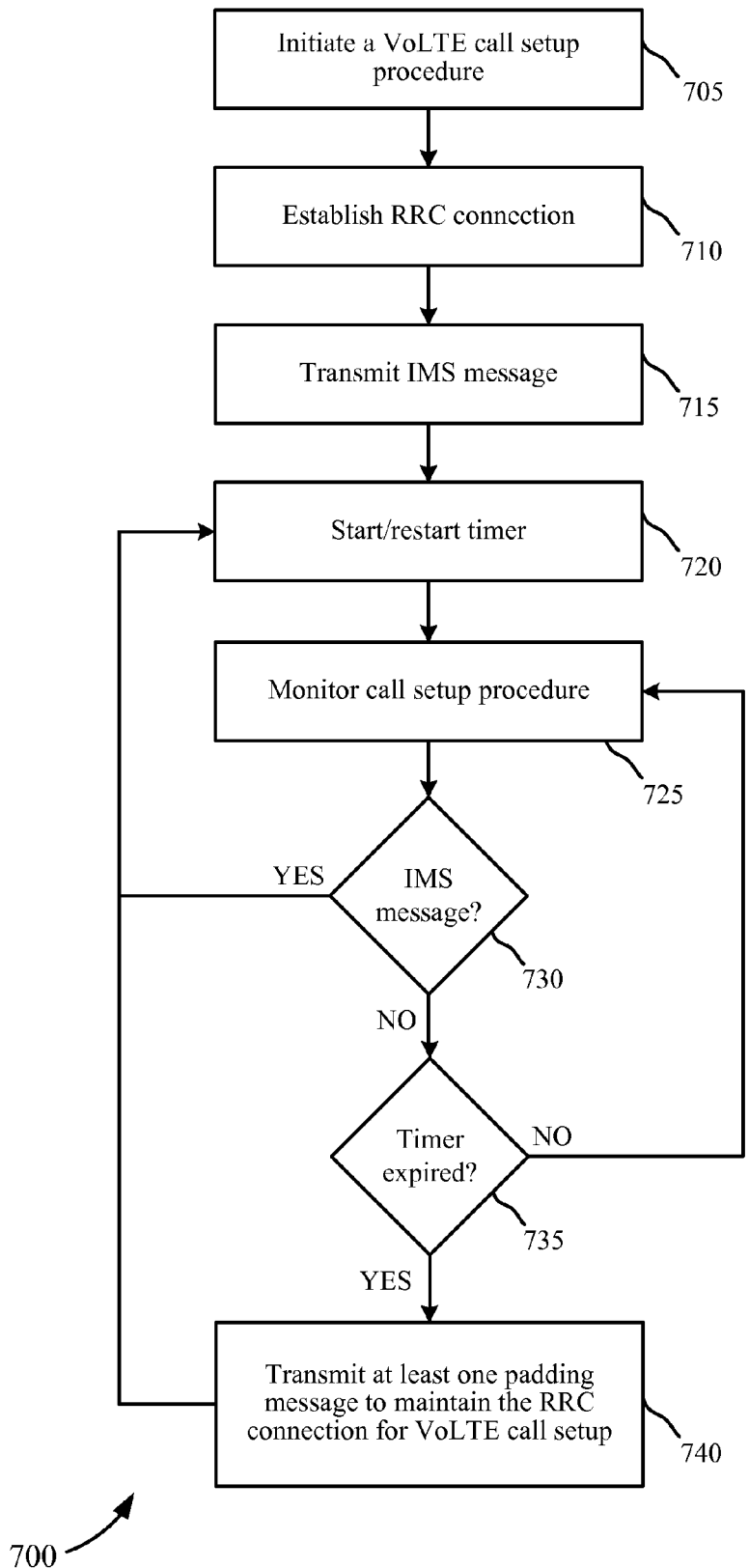
FIG. 7 is a flowchart of another method for call setup for a wireless communications device.

FIG. 7 is a flowchart of another method 700 for call setup for a wireless communications device. For clarity, the method 700 is described below with reference to aspects of one or more of the UEs 115 described with reference to FIGS. 1, 2, 3A, 3B, 4A, 4B, 4C and/or 5. In one implementation, a UE 115 or a processor module thereof may execute one or more sets of codes to control the functional elements of the UE 115 to perform the functions described below.

At block 705, the UE 115 may initiate a VoLTE call procedure. Next, the UE 115 may establish a radio resource control (RRC) connection with a base station as part of the call setup at block 710. The UE 115 may then transmit an IMS (or call setup) message to the base station using the RRC connection at block 715. Alternatively, the UE 115 may receive an IMS (or call setup) message from the base station over the RRC connection.

The UE 115 may start a timer at block 720 upon detecting or otherwise determining that the IMS message has been sent (or received). Then, at block 725, the UE 115 may monitor the call setup procedure to detect further IMS messages between the UE 115 and the base station. In some embodiments, it may be sufficient to monitor the call setup procedure only for IMS messages sent by the UE 115 or only for IMS messages received by the UE 115, for example, depending on the IMS messages used by the base station to restart the RRC connection inactivity timer as the call setup procedure progresses. In other embodiments, the UE 115 may monitor for both.

At block 730, the UE 115 may determine whether an IMS message has occurred (e.g., transmitted and/or received by the UE 115 as determined by the monitoring). If so, the method may return to block 720, where the UE 115 may restart the timer. If no IMS message is detected or otherwise determined to have been sent and/or received, the method may proceed to block 735, where the UE 115 may determine whether the timer has expired or lapsed. If not, the method may return to block 725 to continue monitoring the call setup procedure for IMS messages.

If the timer has expired, the method may proceed to block 740, where the UE 115 may transmit at least one padding message to the base station to maintain the RRC connection for VoLTE call setup. Thereafter, the method may return to block 720, where the UE 115 may restart the timer.

Figure 8:
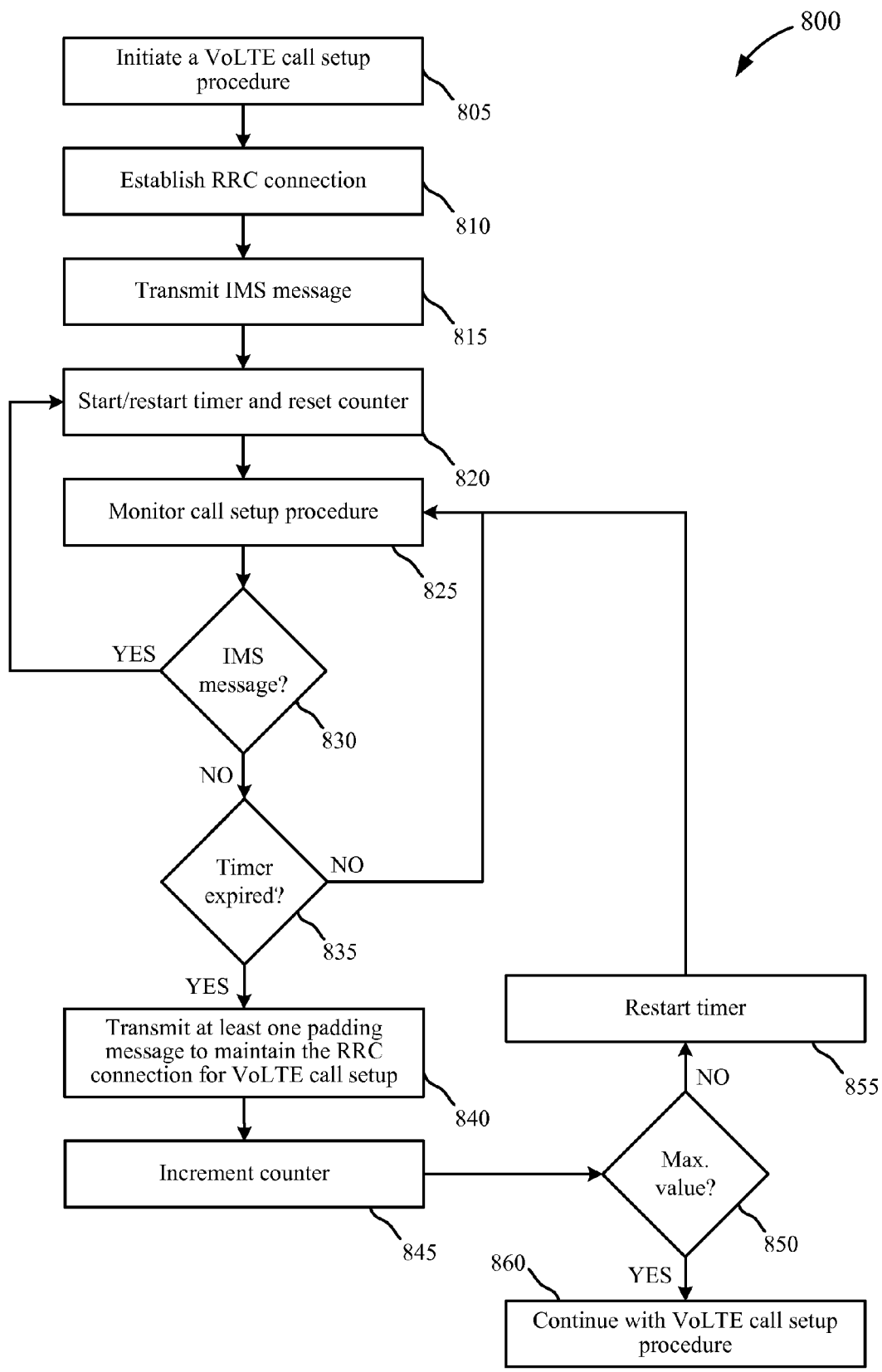
FIG. 8 is a flowchart of yet another method for call setup for a wireless communications device.

FIG. 8 is a flowchart of yet another method 800 for call setup for a wireless communications device. For clarity, the method 800 is described below with reference to aspects of one or more of the UEs 115 described with reference to FIGS. 1, 2, 3A, 3B, 4A, 4B, 4C and/or 5. In one implementation, a UE 115 or a processor module thereof may execute one or more sets of codes to control the functional elements of the UE 115 to perform the functions described below.

At block 805, the UE 115 may initiate a VoLTE call procedure. Next, the UE 115 may establish a radio resource control (RRC) connection with a base station at block 810. The UE 115 may then transmit an IMS (or call setup) message to the base station using the RRC connection at block 815. Alternatively, the UE 115 may receive an IMS (or call setup) message from the base station over the RRC connection.

The UE 115 may start a timer at block 820 upon detecting or otherwise determining that the IMS message has been sent (or received). Then, at block 825, the UE 115 may monitor the call setup procedure to detect further IMS messages between the UE 115 and the base station. Again, it may be sufficient to monitor the call setup procedure only for IMS messages sent by the UE 115, only for IMS messages received by the UE 115, or for both, depending on a particular implementation.

At block 830, the UE 115 may determine whether an IMS message has occurred (e.g., transmitted and/or received by the UE 115 as determined by the monitoring). If so, the method may return to block 820, where the UE 115 may restart the timer. If no IMS message is detected or otherwise determined to have been sent and/or received, the method may proceed to block 835, where the UE 115 may determine whether the timer has expired or lapsed. If not, the method may return to block 825 to continue monitoring the call setup procedure for IMS messages.

If the timer has expired, the method may proceed to block 840, where the UE 115 may transmit at least one padding message to the base station to maintain the RRC connection for VoLTE call setup. Then, the UE 115 may increment a counter at block 845. Once the counter has been incremented, the UE 115 may determine whether the counter has reached its maximum value at block 850, by comparing the incremented value of the counter to the maximum value.

If the incremented value of the counter is less than the maximum value, the maximum value has not been reached and the method may proceed to block 855, where the timer is restarted. Then, the method may return to block 825 to continue monitoring the call setup procedure for IMS messages. If the UE 115 determines, at block 830, that an IMS message has occurred upon further monitoring, the method may return to block 820, where the UE 115 may restart the timer and reset the counter (because the counter has been incremented at block 845).

On the other hand, if the incremented value is not less than the maximum value (e.g., equal to the maximum value), the maximum value has been reached and the method may jump to block 860, where the UE 115 may continue with the VoLTE call setup procedure without further use of the "keep alive" mechanism.

Although not shown in FIG. 8, continuing with the VoLTE call setup procedure without further use of the "keep alive" mechanism after the counter has reached its maximum value may result in the device receiving a connection release message (e.g., notification or instruction), such as when a further delay occurs in the VoLTE call setup procedure that is sufficient for the RCC connection timer at the base station to expire. As noted above, the base station may release the RCC connection at that point or send an instruction to the device that the RRC connection is to be released. In any case, the device may receive a connection release message of some form from the base station. If the device is waiting to receive a certain Internet Protocol (IP) Multimedia Subsystem (IMS) message (e.g., a response) when the device receives the connection release message, the device may immediately transmit at least one padding message to the base station. The padding message (e.g., a repeat of the last IMS message sent by the device) may help the RCC connection to be restored quickly.

Figure 9:
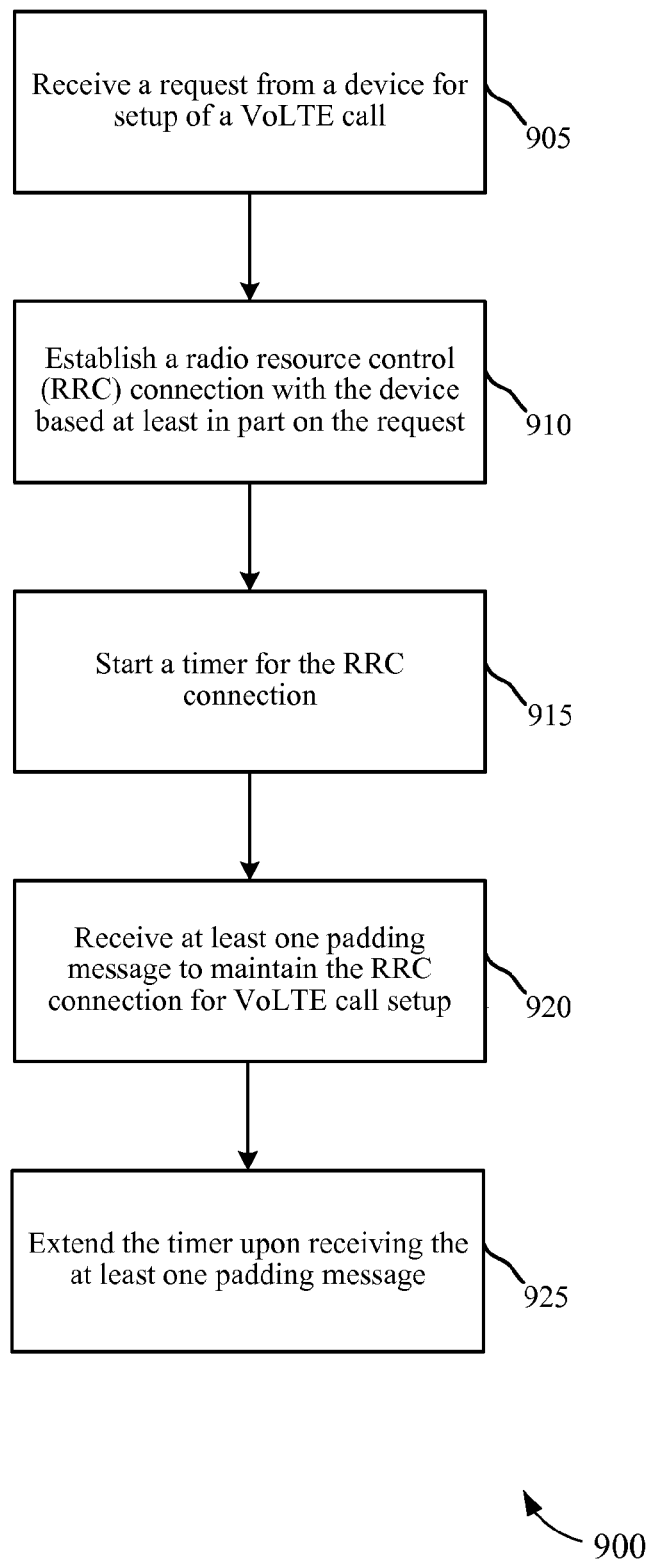
FIG. 9 is a flowchart of still another method for call setup for a wireless communications device.

FIG. 9 is a flowchart of still another method 900 for call setup for a wireless communications device. For clarity, the method 900 is described below with reference to aspects of one or more of the base stations 105 described with reference to FIGS. 1, 2, 3A and/or 3B. In one implementation, a base station 105 or a processor module thereof may execute one or more sets of codes to control the functional elements of the base station 105 to perform the functions described below.

At block 905, the base station 105 may receive a request from a device for setup of a VoLTE call. Next, the base station 105 may establish a radio resource control (RRC) connection with the device based at least in part on the request at block 910. As described herein, this may involve messages and/or negotiating with the device to establish the RRC connection therewith.

The base station 105 may start a timer for the RRC connection at block 815. As described herein, the base station 105 may start the timer when the RRC connection is established or when a particular call setup message occurs in the call setup procedure (e.g., is sent or received). In some embodiments, the timer for the RRC connection may be an RRC connection inactivity timer as described herein.

At block 920, the base station 105 may receive at least one padding message to maintain the RRC connection for VoLTE call setup. As described herein, the padding message(s) may be one or more dummy packets sent by the device. Then, at block 925, the base station 105 may extend or restart the timer so that the timer does not expire and the base station does not release the RRC connection or otherwise cause the RRC connection to be released.

Figure 10:
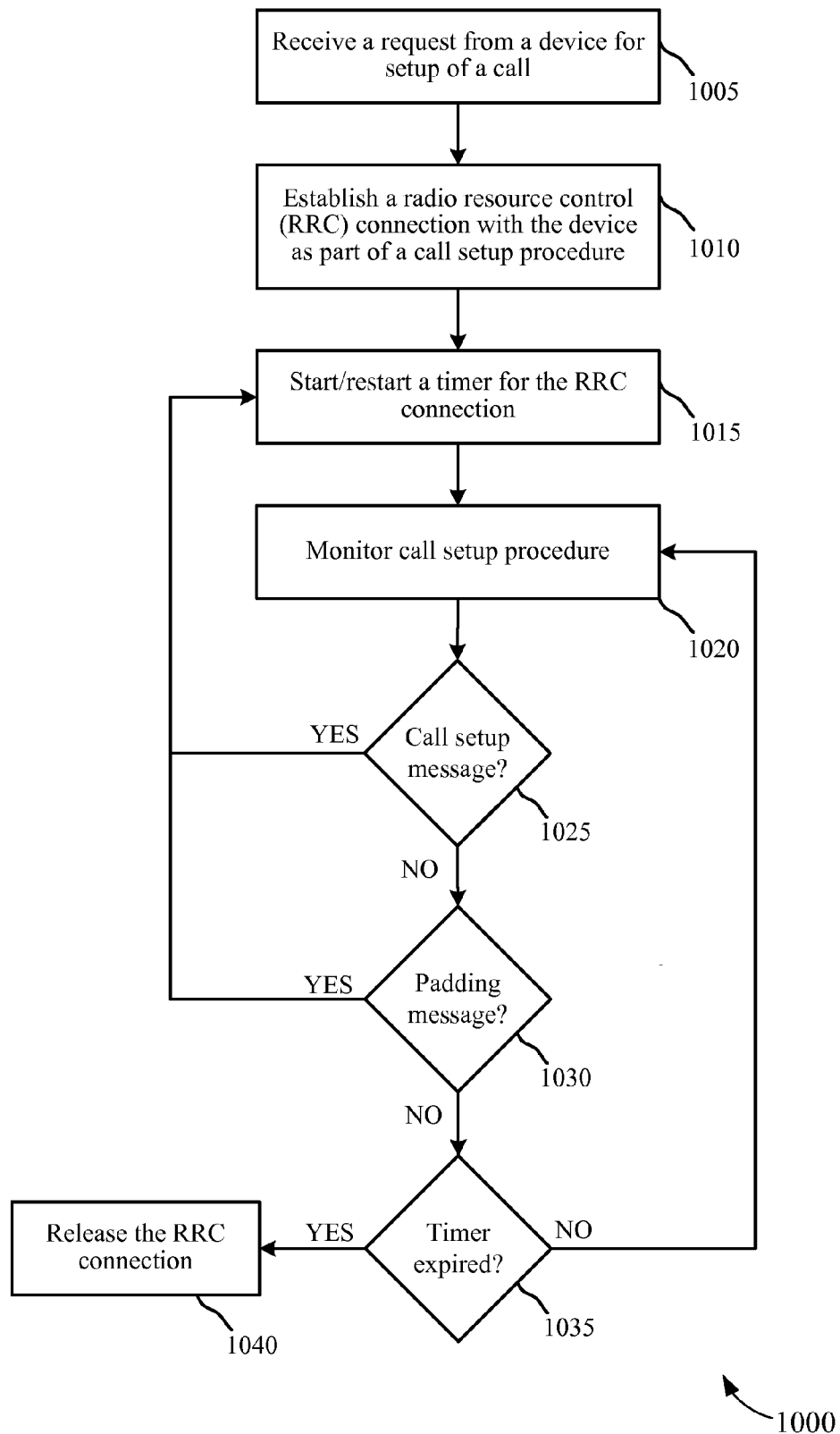
FIG. 10 is a flowchart of a further method for call setup for a wireless communications device.

FIG. 10 is a flowchart of a further method 1000 for call setup for a wireless communications device. For clarity, the method 1000 is described below with reference to aspects of one or more of the base stations 105 described with reference to FIGS. 1, 2, 3A and/or 3B. In one implementation, a base station 105 or a processor module thereof may execute one or more sets of codes to control the functional elements of the base station 105 to perform the functions described below.

At block 1005, the base station 105 may receive a request from a device for setup of a VoLTE call. Next, the base station 105 may establish a radio resource control (RRC) connection with the device as part of a call setup procedure at block 1010.

The base station 105 may start a timer for the RRC connection at block 1015. As described herein, the base station 105 may start the timer when the RRC connection is established or when a particular call setup message occurs in the call setup procedure (e.g., is sent or received). In some embodiments, the timer for the RRC connection may be an RRC connection inactivity timer as described herein.

At block 1020, the base station 105 may monitor the call setup procedure for call setup messages (e.g., IMS messages) sent and/or received by the base station 105. At block 1025, the base station 105 may determine whether an IMS message has occurred (e.g., transmitted and/or received by the base station 105 as determined by the monitoring). If so, the method may return to block 1015, where the base station 105 may restart the timer.

If no IMS message is detected or otherwise determined to have been sent and/or received, the method may proceed to block 1030, where the base station 105 may determine whether a padding message has been received by the base station 105. If so, the method may return to block 1015, where the base station 105 may restart the timer.

If no padding message has been received by the base station 105, the method may proceed to block 1035, where the base station 105 may determine whether the timer has expired or lapsed. If not, the method may return to block 1020 to continue monitoring the call setup procedure for IMS messages.

If the timer has expired, the method may proceed to block 1040, where the base station 105 may release the RRC connection or otherwise cause the RRC connection to be terminated. Thus, the RRC connection may be established with a different UE (or the same UE) upon request rather than having the RRC connection occupied with a call setup procedure that has stalled or otherwise failed.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Thus, the foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for voice over LTE (VoLTE) call setup for a first wireless communication device, comprising:
   initiating a VoLTE call setup procedure to establish voice communications between the first wireless communication device and a second wireless communication device;
   establishing a radio resource control (RRC) connection as part of the VoLTE call setup procedure;
   setting a time period value of a timer based at least in part on a stage of the VoLTE call setup procedure; and
   starting the timer based at least in part on the VoLTE call setup procedure; and
   transmitting at least one padding message upon expiration of the timer to maintain the RRC connection for the VoLTE call setup procedure.

2. The method of claim 1, further comprising:
   transmitting an Internet Protocol (IP) Multimedia Subsystem (IMS) message as part of the VoLTE call setup procedure, the timer being started upon transmission of the IMS message.

3. The method of claim 1, further comprising:
   monitoring the VoLTE call setup procedure for Internet Protocol (IP) Multimedia Subsystem (IMS) messages; and
   restarting the timer if an IMS message for the VoLTE call setup procedure is transmitted or received by the first wireless communication device.

4. The method of claim 1, further comprising:
   receiving an RRC connection release message; and
   transmitting the at least one padding message when the first wireless communication device is waiting to receive a certain Internet Protocol (IP) Multimedia Subsystem (IMS) message upon receipt of the RRC connection release message.

5. The method of claim 1, wherein:
   setting the time period value of the timer is further based at least in part on a time period value of a timer associated with the RRC connection.

6. The method of claim 1, wherein:
   setting the time period value of the timer is further based at least in part on statistics of dropped or released RRC connections.

7. The method of claim 1, wherein setting the time period value of the timer based at least in part on the stage of the VoLTE call setup procedure comprises:
   setting a first time period value for the timer for a first stage of the VoLTE call setup procedure; and
   setting a second time period value for the timer for a second stage of the VoLTE call setup procedure, the second time period value being greater that the first time period value and the second stage being later in the VoLTE call setup procedure than the first stage.

8. The method of claim 1, further comprising:
   incrementing a counter upon expiration of the timer; and
   restarting the timer if the counter has not reached a determined maximum value by the incrementing.

9. The method of claim 8, further comprising:
   monitoring the VoLTE call setup procedure for Internet Protocol (IP) Multimedia Subsystem (IMS) messages; and
   restarting the timer and resetting the counter if an IMS message for the VoLTE call setup procedure is transmitted or received by the first wireless communication device.

10. The method of claim 8, further comprising:
    determining the maximum value of the counter based at least in part on statistics of dropped or released RRC connections.

11. The method of claim 8, further comprising:
    determining the maximum value of the counter based at least in part on the stage of the VoLTE call setup procedure.

12. The method of claim 11, wherein determining the maximum value of the counter based at least in part on the stage of the VoLTE call setup procedure comprises:
    determining a first maximum value of the counter for a first stage of the VoLTE call setup procedure; and
    determining a second maximum value of the counter for a second stage of the VoLTE call setup procedure, the second maximum value being greater that the first maximum value and the second stage being later in the VoLTE call setup procedure than the first stage.

13. The method of claim 1, wherein transmitting the at least one padding message is configured to reset an RRC connection timer associated with the VoLTE call setup procedure.

14. The method of claim 1, wherein transmitting the at least one padding message comprises:
    transmitting at least one dummy packet.

15. An apparatus for voice over LTE (VoLTE) call setup for a first wireless communication device, comprising:
    means for initiating a VoLTE call setup procedure to establish voice communications between the first wireless communication device and a second wireless communication device;
    means for establishing a radio resource control (RRC) connection as part of the VoLTE call setup procedure;

means for setting a time period value of a timer based at least in part on a stage of the VoLTE call setup procedure;
means for starting the timer based at least in part on the VoLTE call setup procedure; and
means for transmitting at least one padding message upon expiration of the timer to maintain the RRC connection for the VoLTE call setup procedure.

16. The apparatus of claim 15, further comprising:
means for transmitting an Internet Protocol (IP) Multimedia Subsystem (IMS) message as part of the VoLTE call setup procedure, the timer being started upon transmission of the IMS message.

17. The apparatus of claim 15, further comprising:
means for monitoring the VoLTE call setup procedure for Internet Protocol (IP) Multimedia Subsystem (IMS) messages; and
means for restarting the timer if an IMS message for the VoLTE call setup procedure is transmitted or received by the first wireless communication device.

18. The apparatus of claim 15, further comprising:
means for setting the time period value of the timer based at least in part on a time period value of a timer associated with the RRC connection.

19. The apparatus of claim 15, further comprising:
means for incrementing a counter upon expiration of the timer; and
means for restarting the timer if the counter has not reached a determined maximum value by the incrementing.

20. The apparatus of claim 19, further comprising:
means for monitoring the VoLTE call setup procedure for Internet Protocol (IP) Multimedia Subsystem (IMS) messages; and
means for restarting the timer and resetting the counter if an IMS message for the VoLTE call setup procedure is transmitted or received by the first wireless communication device.

21. The apparatus of claim 15, wherein the at least one padding message is configured to reset an RRC connection timer associated with the VoLTE call setup procedure.

22. An apparatus for voice over LTE (VoLTE) call setup for a first wireless communication device, comprising:
a processor;
memory in electronic communication with the processor, the memory embodying instructions, the instructions being executable by the processor to:
initiate a VoLTE call setup procedure to establish voice communications between the first wireless communication device and a second wireless communication device;
establish a radio resource control (RRC) connection as part of the VoLTE call setup procedure;
set a time period value of a timer based at least in part on a stage of the VoLTE call setup procedure;
start the timer based at least in part on the VoLTE call setup procedure; and
transmit at least one padding message upon expiration of the timer to maintain the RRC connection for the VoLTE call setup procedure.

23. The apparatus of claim 22, wherein the instructions are executable by the processor to:
transmit an Internet Protocol (IP) Multimedia Subsystem (IMS) message as part of the VoLTE call setup procedure, the timer being started upon transmission of the IMS message.

24. The apparatus of claim 22, wherein the instructions are executable by the processor to:
monitor the VoLTE call setup procedure for Internet Protocol (IP) Multimedia Subsystem (IMS) messages; and
restart the timer if an IMS message for the VoLTE call setup procedure is transmitted or received by the first wireless communication device.

25. The apparatus of claim 22, wherein the instructions are executable by the processor to:
increment a counter upon expiration of the timer; and
restart the timer if the counter has not reached a determined maximum value by the incrementing.

26. The apparatus of claim 25, wherein the instructions are executable by the processor to:
monitor the VoLTE call setup procedure for Internet Protocol (IP) Multimedia Subsystem (IMS) messages; and
restart the timer and reset the counter if an IMS message for the VoLTE call setup procedure is transmitted or received by the first wireless communication device.

27. A method for voice over LTE (VoLTE) call setup for a first wireless communication device, comprising:
receiving a request from the first wireless communication device for setup of a VoLTE call to establish voice communications between the first wireless communication device and a second wireless communication device;
establishing a radio resource control (RRC) connection with the first wireless communication device based at least in part on the received request;
setting a time period value of a timer for the RRC connection based at least in part on a stage of the VoLTE call setup;
starting the timer for the RRC connection;
receiving at least one padding message to maintain the RRC connection for the VoLTE call setup; and
extending the timer upon receiving the at least one padding message.

28. The method of claim 27, wherein extending the timer comprises:
restarting the timer.

29. The method of claim 27, wherein receiving the at least one padding message comprises:
receiving at least one dummy packet.

30. The apparatus of claim 15, wherein the means for setting the time period value of the timer based at least in part on the stage of the VoLTE call setup procedure comprises:
means for setting a first time period value for the timer for a first stage of the VoLTE call setup procedure; and
means for setting a second time period value for the timer for a second stage of the VoLTE call setup procedure, the second time period value being greater that the first time period value and the second stage being later in the VoLTE call setup procedure than the first stage.

* * * * *